(No Model.)
W. C. BROWN.
COTTON SCOOP.
No. 495,579. Patented Apr. 18, 1893.
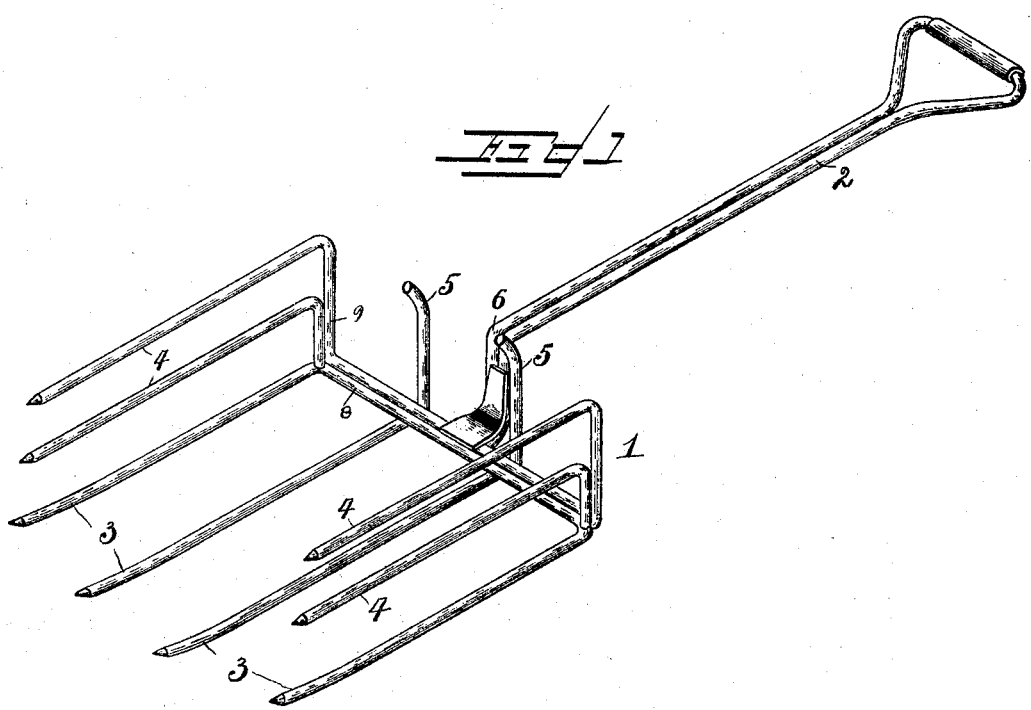
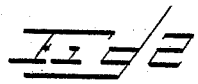
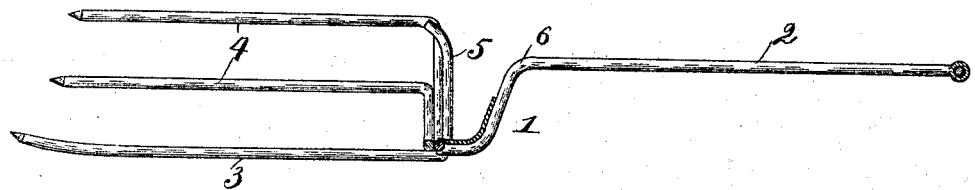
Witnesses
W. O. Schneider
N. J. Riley
Inventor
W. C. Brown.
By his Attorneys,
C. A. Snow & Co.
THE NORRIS PETERS CO., PHOTO-LITHO., WASHINGTON, D. C.

UNITED STATES PATENT OFFICE.

WILLIAM C. BROWN, OF DAVILLA, TEXAS.

COTTON-SCOOP.

SPECIFICATION forming part of Letters Patent No. 495,579, dated April 18, 1893.

Application filed October 11, 1892. Serial No. 448,528. (No model.)

*To all whom it may concern:*

Be it known that I, WILLIAM C. BROWN, a citizen of the United States, residing at Davilla, in the county of Milam and State of Texas, have invented a new and useful Cotton-Scoop, of which the following is a specification.

The invention relates to improvements in cotton scoops.

The object of the present invention is to provide a simple and inexpensive scoop designed especially for handling cotton and adapted to have its tines yield to facilitate its insertion in a mass of cotton.

The invention consists in the construction and novel combination and arrangement of parts hereinafter fully described, illustrated in the accompanying drawings, and pointed out in the claims hereto appended.

In the drawings—Figure 1 is a perspective view of a cotton scoop constructed in accordance with this invention. Fig. 2 is a longitudinal sectional view.

Like numerals of reference indicate corresponding parts in both the figures of the drawings.

1 designates a cotton scoop having a handle 2 and provided with bottom tines 3 arranged parallel, and having side tines 4 forming opposite sides disposed perpendicular to the bottom. The tines are resilient and adapted to readily yield when inserted in cotton to facilitate the handling of the same, and their outer ends are pointed. The bottom tines have their outer portion slightly curved upward to enable the scoop to be moved over a floor or other supporting surface without the pointed ends of the bottom tines sticking into the same. The scoop is provided at its back with vertical parallel stop prongs 5 forming continuations of the rear ends of the bottom tines, and closing the back of the scoop to hold the cotton therein. The perpendicular sides and the back stop prongs form a rectangular basket of the scoop especially adapted for handling cotton. The handle 2 which may be of any desired form is connected at its inner end with the scoop by a downward bend 6. The handle and the tines are secured together by welding, or other suitable analogous means. The outer ones of the bottom tines 3 are formed of a continuous piece of metal, and are connected at their inner or rear ends by a transverse portion 8; and the top ones of the side tines 4 are constructed of a single piece of metal, and are connected at their rear ends by a rectangular portion 9.

It will readily be seen that the cotton scoop is simple and comparatively inexpensive in construction, and that it greatly facilitates the handling of cotton.

Changes in the form, proportion, and the minor details of construction may be resorted to without departing from the principle or sacrificing any of the advantages of this invention.

What I claim is—

1. A cotton scoop having a handle and forming an approximately rectangular basket comprising the parallel bottom tines, the parallel side tines forming perpendicular sides and the vertical stop prongs arranged at right angles to the bottom tines and forming the back of the scoop, substantially as described.

2. A cotton scoop having a handle and forming an approximately rectangular basket comprising the bottom tines, the side tines of unequal lengths forming perpendicular sides and the upwardly extending stop prongs forming the back of the scoop, arranged at right angles to the bottom tines substantially as described.

In testimony that I claim the foregoing as my own I have hereto affixed my signature in the presence of two witnesses.

WILLIAM C. BROWN.

Witnesses:
   A. H. KERR,
   M. S. PARK.